United States Patent [19]

Brimer et al.

[11] 4,171,493

[45] Oct. 16, 1979

[54] INTEGRAL BRAKING SYSTEM FOR LINEAR INDUCTION MOTOR

[75] Inventors: Claude M. Brimer, Bryan, Ohio; Joe W. Von Brimer, deceased, late of Las Vegas, Nev., by Claude M. Brimer, executor

[73] Assignee: Linear International Corporation, Rancho La Costa, Calif.

[21] Appl. No.: 846,888

[22] Filed: Oct. 31, 1977

[51] Int. Cl.$^2$ ............................................. H02K 41/02
[52] U.S. Cl. ......................................... 310/13; 310/17; 310/77
[58] Field of Search .................... 310/12-14, 310/76, 77, 78, 17, 19; 318/135; 104/148 LM

[56] References Cited

U.S. PATENT DOCUMENTS

| | | | |
|---|---|---|---|
| 3,376,441 | 4/1968 | Martin et al. ........................... | 310/13 |
| 3,531,666 | 9/1970 | Ford ........................................ | 310/13 |
| 3,641,939 | 2/1972 | Remy ............................. | 104/148 LM |
| 3,697,838 | 10/1972 | New ..................................... | 318/135 |

Primary Examiner—Donovan F. Duggan
Attorney, Agent, or Firm—Lockwood, Dewey, Alex & Cummings

[57] ABSTRACT

A linear induction motor includes one ferromagnetic member thereof which is movably resiliently mounted in the motor frame so as to move toward the stator in the motor whenever current is applied thereto. A portion of the armature in the motor extends between the resiliently movable member and the motor frame. When the motor is energized the armature is free to move between the ferromagnetic member and stator. When the motor is de-energized, the resiliently movable member is biased toward the motor frame and sandwiches the armature between the member and the frame so as to prevent the movement thereof. Reactivating the motor then attracts the movable member toward the stator and frees the armature.

8 Claims, 3 Drawing Figures

FIG-1-
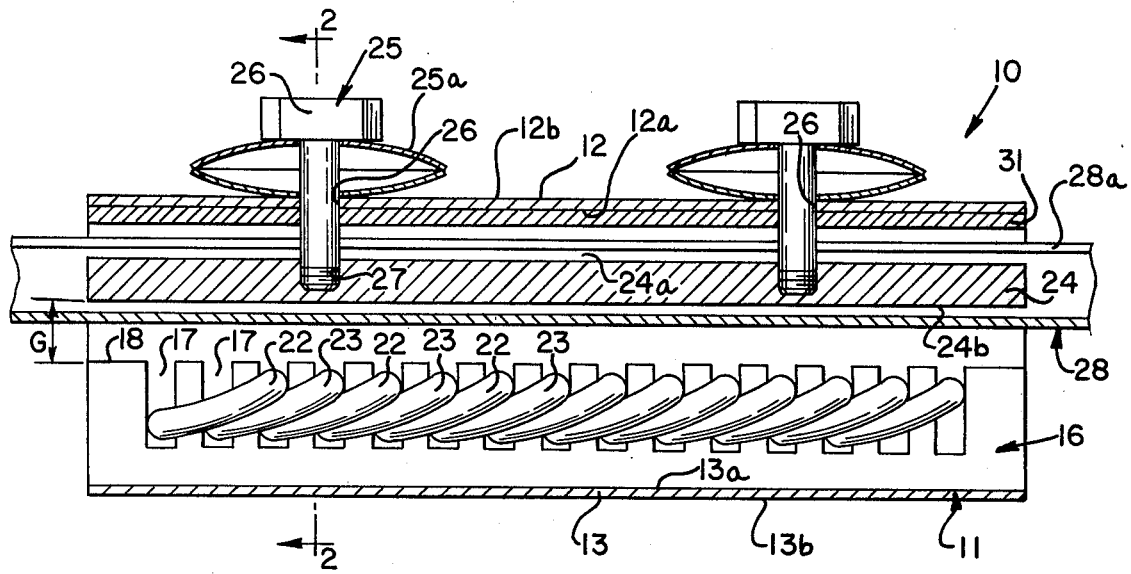
FIG-2-
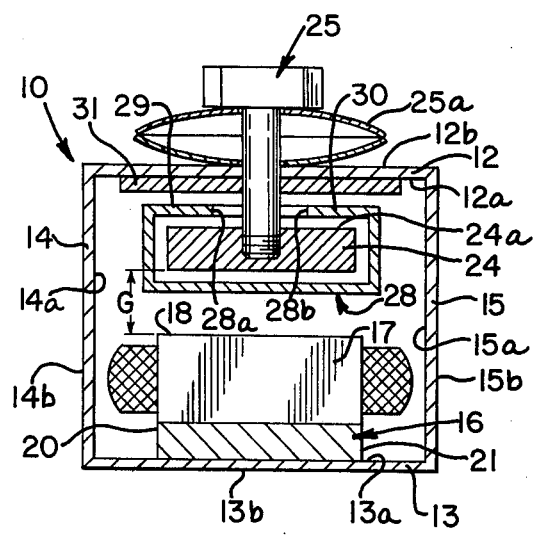
FIG-3-
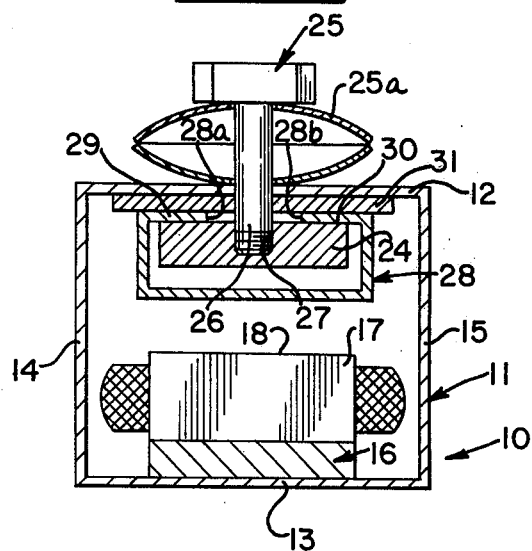

INTEGRAL BRAKING SYSTEM FOR LINEAR INDUCTION MOTOR

BACKGROUND OF THE INVENTION

This invention relates to a braking mechanism for a linear induction motor, and more particularly, the invention relates to a fail-safe mechanism formed integrally with the motor which automatically stops the motor armature when electric current ceases flowing through the motor.

Linear motors of the type including a movable member or armature which is caused to move perpendicularly through a gap between a plurality of fixed stators, or stators and fixed cooperating magnetic return path members, have heretofore been widely known and used. This type of linear motor has one disadvantage in that the armature is free to move in an axial direction when the motor is not energized, i.e., when there is an absence of magnetic flux across the gap. While the armature in a conventional curvilinear electric motor is free to rotate when it is not energized, the free transitory motion available to the armature in a linear motor in certain instances poses more substantial problems than does the freedom to rotate of a conventional motor.

Heretofore, braking mechanisms for linear induction motors have been operated by a system which is independent of the motor circuit. These braking mechanisms have been utilized in connection with one common application of the linear induction motor which is as a driving part of a monorail transportation system. U.S. Pat. Nos. 3,198,138 and 3,618,529 disclose hydraulically or pneumatically operated brake pad members in a linear motor which frictionally bind the movable motor member (monorail) to the stationary motor members. Both of the systems are operated by systems independent of the motor circuit. In U.S. Pat. No. 3,356,041, electrical pole-switching is utilized to obtain a reverse thrust for braking on a monorail transportation system.

A need has arisen for a simple braking mechanism which secures the armature of a linear induction motor in a stationary position, as desired. An additional need exists for a fail-safe type of brake mechanism in a linear induction motor.

SUMMARY OF THE INVENTION

It is therefore a general object of the invention to provide an improved brake for a linear induction motor.

Another object of the invention is the provision of a simple brake mechanism which is formed and operates integrally with a linear induction motor.

A further object of the invention is the provision of an improved braking system for a linear induction motor which actuates in a fail-safe manner.

This invention relates to a linear induction motor including a rigid frame and a stationary ferromagnetic member fixedly mounted thereto. A first movable ferromagnetic member is resiliently mounted on the frame and defines a gap between the two members. An electric circuit is associated with at least one of the members for producing a magnetic flux across the gap and causing an attraction which moves the first member towards the stationary member. A second movable non-magnetic member is elongate and has a channel-shape cross-section. The first movable member is positioned inside the hollow interior of the channel of the second movable member. The collapse of the magnetic flux across the gap causes the first movable member to bind the second movable member between the first movable member and the frame.

DETAILED DESCRIPTION OF THE PREFERRED EMBODIMENT

Referring to FIG. 1, a linear motor constructed in accordance with the present invention is generally indicated at 10, and it includes an elongate hollow frame, generally indicated at 11, having generally rectangular opposed top and bottom walls 12, 13, respectively, and opposed sidewalls 14, 15, respectively. The interior surface of each frame wall is denoted by the wall numeral plus the letter a, and the exterior surface of each frame wall is designated by that wall numeral plus the letter b, respectively.

The parts making up the linear motor in FIG. 1, to a great extent, are mounted in the hollow area defining the interior of the motor frame 11. A wound multiphase linear stator, generally indicated by the numeral 16, is fixedly secured to the inner surface 13a of the bottom sidewall 13 of frame 11. Stator 16, preferably formed of a ferromagnetic material such as iron or the like forms a generally elongate rectangular polyhedral outline having substantially rectangular exterior surfaces thereon. A plurality of rectangular slots 17—17 extend perpendicularly inwardly from the top surface 18 of stator 16 in even spaced relation along that surface. The slots extend from one side surface 20 to the opposing side surface 21 of stator 16 thus defining paths in which the plural phase circuit wires 22, 23 are wound in a conventional manner.

An elongate bar 24, preferably made of soft iron and having generally rectangular side surfaces defining the outline of same, is mounted so as to depend in movable spaced relation from the inner surface 12a of top frame wall 12. In other words, the upper flat surface 24a of return iron 24 is positioned in generally parallel spatial relation from the inner surface 12a of upper frame sidewall 12 and that parallel spatial relation is variable due to the means for mounting the return iron to the frame sidewall. Also, the position of the return iron 24 defines a gap between the bottom surface 24b thereof and the top surface 18 of stator 16, which is denoted by the letter G.

An important aspect of the invention is the mechanism 25 for movably mounting the return iron 24 to the frame 11. Each of a plurality of bolts 26 forming a part of the mechanism 25 is slidably retained in an aperture 27 which extends through the upper frame sidewall 12. The apertures 27 are preferably positioned in aligned spaced relation axially along the frame top wall. The distal threaded end of each bolt 26 is solidly retained in one of a plurality of threaded apertures 27 aligned in spaced relation axially along the return iron 24 and extending inwardly of the top surface 24a thereof. The respective apertures 26 and 27 are positioned in their respective members in aligned spatial relation to each other. A resilient spring 25a, which, in this embodiment, is a belleville washer mechanism, is positioned around the stem of each bolt 26 and retained therebetween the upper surface 12b of upper frame sidewall 12 and the enlarged head of each bolt 26. The belleville washer or another like mechanism biases each bolt 26 toward the outside of the upper frame sidewall 12.

As another important aspect of the invention, linear motor 10 further includes an elongate armature, generally indicated at 28, which, in this embodiment, has a C-channel cross-sectional shape. Armature 30 may also be described as having rectangular sides, a rectangular hollow interior, and an elongate slot which bifurcates the top sidewall along the length thereof. A preferred material for armature 28 is a conductive non-magnetic material such as aluminum, copper, or the like. As shown most clearly in FIG. 2, the hollow interior of armature to surround to a greater extent the return iron 24 positioned spatially thereadjacent. The spatial distance between the distal ends 28a, 28b of the bifurcated top wall of armature 28 is of sufficient size to allow the passage of the stems of bolts 26 therethrough.

As shown most clearly in FIG. 3, when the armature 28 is mounted around the return iron 24, both of the dual distal wall portions 29, 30 of armature 28 are sandwiched between the upper surface 24a of return iron 24, and a pad 31 (to be discussed below) which is mounted on the bottom surface 12a of top frame wall 12. It should be noted that the distal end surfaces 28a, 28b of armature 28 extend along the length thereof thus allowing the armature to translate axially through the motor 10 when the motor is energized, i.e., when a magnetic field extends across the spatial gap between the stators 16 and the return iron 24. The magnetic field supports the armature 28 in sptaial relation to the remainder of the motor 10 when it is in an energized state.

Additionally, the linear motor 10 includes a thin elongate friction pad 31 which is fixedly mounted to the interior surface 12a of upper frame sidewall 12 so as to be sandwiched between the frame 11 and the spatially related bifurcated top wall portions 29, 30 of armature 28. Friction pad 31 is formed of material conventionally used for automotive brake linings or the like.

Referring to FIG. 2, the linear induction motor 10 of the invention is shown as it appears in an energized or operating state. When a multi-phase alternating electric current is sent through the windings 22, 23 on stator 16, a magnetic flux is generated across the gap G. The ferromagnetic return iron is attracted to the stator 16 as a result of the generation of the magnetic field. The attraction is sufficiently great to overcome the biasing force of the plurality of belleville washers 25a—25a on the movable mounting mechanisms 25 and draw the return iron 24 toward the stator 16. With the return iron 24 in the dependent position shown in FIG. 2, the armature 28 is free to move. In position, the armature 28 will be attached to some object (not shown), the movement of which will be controlled by the translator movement of the armature 28.

As stated previously, one disadvantage of heretofore known linear induction motors has been the freedom of movement of armature 28 when the motor has been de-energized. As shown most clearly in FIG. 3, when the linear induction motor 10 of the invention is de-energized, i.e., when the magnetic flux collapses, the biasing arrangement of the movable mounting mechanism 25 for the return iron 24 causes the return iron to sandwich the distal portions 29, 30 of the armature 28 between the return iron 24 and the friction pad 31. The force output of the motor, the capacity of the belleville washers 25a—25a or other springs utilized, and the co-efficients of friction between the armature, return iron, and friction pad determine the amount of restraining force in the mechanism 25 which is normal to the axis of armature 28. Therefore, by changing these variables, the brake mechanism of the invention may be utilized to stop the armature 28 in any desired variable time length or distance after the motor is de-energized or the motor may be engineered the slow the armature down to a desired movement during energization or after de-energization.

It should also be noted that the automatic biasing of the movable mounting mechanism 25 of the invention provides a fail-safe means of operation for the induction motor 10. Therefore, the usual deficiencies found in heretofore known linear induction motors have been overcome by the present invention. Further, the biasing means and movable mounting of the return iron 24 provide an extremely simple solution to the problems heretofore existing. The simplicity of the structure provides great reliability over that found in other types of externally operated brake structures, such as shown in the prior art.

While one particular embodiment of the invention has been shown and described, it will be obvious to those skilled in the art that changes and modifications may be made without departing from the invention in its broader aspects. For example, in motors employing plural would ferromagnetic members, one of the members could replace the return iron 24. Also, the positions of the return iron 24 and stator 16 in the embodiment shown could be reversed. The size of armature 28 would then be varied to accomodate the positioning of the windings in the hollow interior thereof, and to position a flat surface to provide friction contact with the armature. Therefore, the aim in the appended claims is to cover all such changes and modifications as fall within the true spirit and scope of the invention.

We claim:

1. In a linear induction motor comprising:
    a rigid frame,
    a stationary ferromagnetic member fixedly mounted on said frame and insulated therefrom;
    a first movable ferromagnetic member including means for resiliently mounting same on said frame so as to be biased thereagainst and further defining a gap between said ferromagnetic members;
    at least a portion of an electric circuit associated with at least one of said ferromagnetic members for producing a magnetic flux across said gap therebetween which is capable of overcoming said bias and moving said first member toward said stationary member;
    a second movable non-magnetic member being elongate and defining a channel-shape cross-section, one portion of said second member being disposed in said gap and another portion thereof being disposed between said first movable member and said frame; and
    the collapse of said magnetic flux across said gap causing said biased first movable member to bind said second movable member between said first movable member and said frame.

2. The motor defined in claim 1 wherein
    said electric circuit includes a plurality of windings on said one member, said windings being adapted to carry respective phases of a plural-phase electric circuit.

3. The motor defined in claim 1 wherein
    said second movable member is responsive to said magnetic flux which tends to move same generally perpendicularly through said gap.

4. The motor defined in claim 2 wherein
    said windings are on said stationary member, said first movable member has surfaces which are generally rectangular, and said second movable member has a generally C-channel cross-section with the hollow interior thereof being a size sufficient to axially position said first movable member therein and with the opening between the distal portions thereof being of sufficient size to allow the positioning of at least a portion of said resilient mounting means therein.

5. The motor defined in claim 1 wherein said resilient mounting means include an elongate rod member rigidly mounted on said first movable member;

an aperture through a wall of said frame in which said rod member is slidably retained;

stop means mounted on the distal end of said rod member; and spring means positioned in biasing relation to said rod member between said frame wall and said stop means.

6. The motor defined in claim 5 wherein said spring means includes a belleville washer.

7. The motor as defined in claim 1 wherein said frame further includes a friction pad mounted on one of said frame and said first movable member and positioned between said frame and said first movable member.

8. In a linear induction motor comprising:

a motor frame;

a stator mounted in insulated manner on said frame, said stator being of generally rectangular outline and including a plurality of parallel slots extending therein from at least one surface thereof, and a plurality of windings mounted on said stator through said slots therein;

a flux return member having a generally rectangular outline and including spring biased mounting means for biasing said member against said frame in a movable position spatially opposite said frame from said stator and defining a gap therebetween;

at least a portion of an electric circuit connected with said plurality of windings which is energized to produce a magnetic flux across said gap by passing a plural phase alternating current therethrough; said magnetic flux causing an attraction between said return member and said stator which overcomes said biasing means to move said return member toward said stator;

an armature disposed in said gap for moving transversely therethrough in response to said magnetic flux, said armature being elongate and having a generally C-channel cross-section therethrough defined by rectangular side surfaces thereon, the hollow interior of said channel being of sufficient size to slidably retain said return iron therein, and the distance between the distal ends of said C-channel being sufficient to allow the positioning of at least a portion of said spring biased means therein; and the collapse of said magnetic flux across said gap causing said biased return member to bind the distal portions of said armature against said frame.

* * * * *